US012608299B2

(12) United States Patent
Giralt Ballbe et al.

(10) Patent No.: US 12,608,299 B2
(45) Date of Patent: Apr. 21, 2026

(54) SYSTEM AND METHOD FOR AUTOMATED UNIT TEST GENERATION FOR PROGRAMMING SOURCE CODE

(71) Applicant: CloudBlue LLC, Irvine, CA (US)

(72) Inventors: Arnau Giralt Ballbe, Barbera del Valles (ES); Neri Martinez, Barcelona (ES); Anton Hinz, Stadtbergen (DE)

(73) Assignee: CloudBlue LLC, Irvine, CA (US)

( * ) Notice: Subject to any disclaimer, the term of this patent is extended or adjusted under 35 U.S.C. 154(b) by 227 days.

(21) Appl. No.: 18/351,744

(22) Filed: Jul. 13, 2023

(65) Prior Publication Data

US 2025/0021470 A1     Jan. 16, 2025

(51) Int. Cl.
*G06F 11/3668* (2025.01)
*G06F 8/41* (2018.01)

(52) U.S. Cl.
CPC ............ *G06F 11/3684* (2013.01); *G06F 8/42* (2013.01); *G06F 11/3688* (2013.01)

(58) Field of Classification Search
CPC ..... G06F 11/3688; G06F 8/42; G06F 11/3684
See application file for complete search history.

(56) References Cited

U.S. PATENT DOCUMENTS

| | | | | |
|---|---|---|---|---|
| 9,792,443 | B1 | 10/2017 | Sheridan | |
| 2019/0391910 | A1 | 12/2019 | Okazaki | |
| 2022/0066747 | A1 | 3/2022 | Drain | |
| 2022/0075710 | A1* | 3/2022 | Glowa | ................ G06F 11/3684 |

FOREIGN PATENT DOCUMENTS

| | | | | | |
|---|---|---|---|---|---|
| CN | 112035370 | A | * | 12/2020 | |
| CN | 113010431 | A | * | 6/2021 | .......... G06F 11/3684 |
| CN | 113448874 | A | * | 9/2021 | .......... G06F 11/3684 |
| CN | 113778848 | A | * | 12/2021 | .......... G06F 11/3684 |
| JP | 2010267266 | A | * | 11/2010 | .......... G06F 11/3668 |

OTHER PUBLICATIONS

International Search Report and Written Opinion issued in PCT/US2024/037899, dated Nov. 22, 2024, 16 pgs.

* cited by examiner

*Primary Examiner* — Phillip H Nguyen
(74) *Attorney, Agent, or Firm* — Ice Miller LLP

(57)     ABSTRACT

A system for generating unit tests based on source code is disclosed having a computer; a source code file containing source code having a plurality of constructs; the plurality of constructs each being of a type, such types including functions, return statements, property assignments, function calls, and branches; an abstract syntax tree generated by the computer based on the source code and the plurality of constructs; the abstract syntax tree having a plurality of nodes, wherein each of the plurality of constructs in the source code has a corresponding node; at least one unit test generated by the computer based on the nodes of the abstract syntax tree and pre-defined rules; the unit test including at least one grouping function corresponding to a function or a branch construct and at least one trial function corresponding to a return statement, a property assignment, or a function call construct.

20 Claims, 10 Drawing Sheets

```
export default {
  data: () => ({
    loading: false,
    isOpen: false,
  }),
  methods: {
    setLoading() {
      this.loading = true;
    },
  },
};
```

2b

```
{
  data: {
    $$type: 'arrow',
    $$source: `date: () => ({\n    loading: false,\n    isOpen: false,\n    })`,
  },
  methods: {
    setLoading: {
      $$source: `setLoading() {\n    this.loading = true;\n    }`,
      $$type: 'method',
    },
  },
};
```

22b

22b

```
"import Simple from './Simple.vue';describe ('Simple component', () => { let
context; let result; describe('#data', () => { it('returns {"loading":
false,"isOpen": false,}', () =>
{ result=Simple, data(context);expect(true).toEqual(false); }); });describe('
methods', () => { describe ('#setLoading', () => { beforeEach(() => { context
= {loading: undefined }; }); it('assigns #loading to the value true', () =>
{ Simple,methods,setLoading.call(context);expect(true).toEqual(false); }); }
); }); }); });"
```

```
import Simple from './Simple.vue';
describe ('Simple component', () => {
    let context;
    let result;
    describe('#data', () => {
        it('returns {"loading": false,"isOpen": false,}', () => {
            result=Simple, data(context);
            expect(true).toEqual(false);
        });
    });
    describe('methods', () => {
        describe (#setLoading', () => {
            beforeEach(() => {
                context = {loading: undefined };
            });
            it('assigns #loading to the value true', () => {
                Simple, methods, setLoading.call(context);
                expect(true).toEqual(false);
            });
        });
    });
});
```

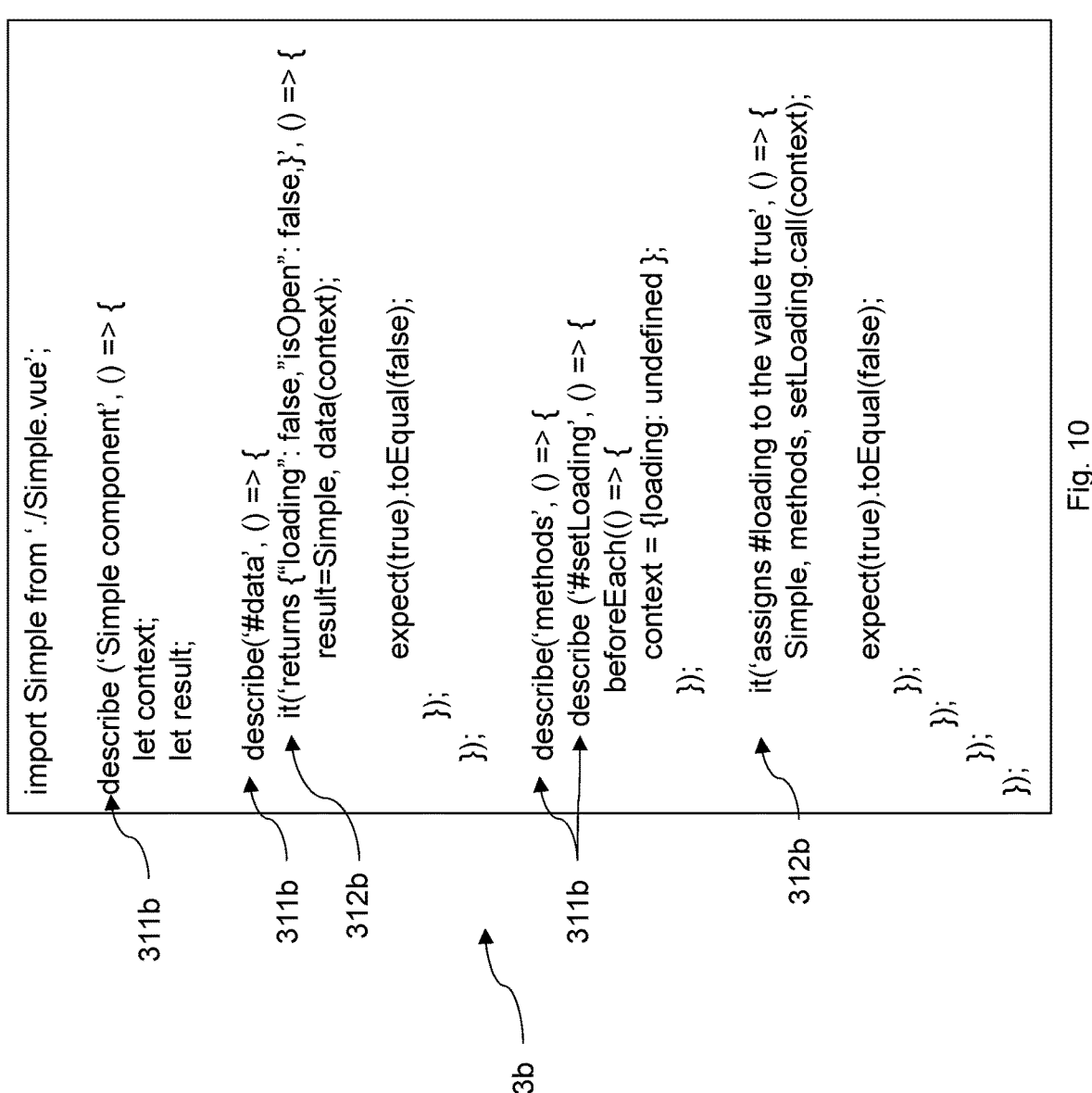

```
import Simple from '/Simple.vue';

describe ('Simple component', () => {
    let context;
    let result;

describe('#data', () => {
    it('returns {"loading": false, "isOpen": false,}', () => {
        result=Simple, data(context);

expect(true).toEqual(false);

});
});

describe('methods', () => {
    describe ('#setLoading', () => {
        beforeEach(() => {
            context = {loading: undefined };

});

it('assigns #loading to the value true', () => {
            Simple, methods, setLoading.call(context);

expect(true).toEqual(false);

SYSTEM AND METHOD FOR AUTOMATED UNIT TEST GENERATION FOR PROGRAMMING SOURCE CODE

TECHNICAL FIELD

The present disclosure relates to automated unit test generation for programming source code. Specifically, the present disclosure relates to static source code analysis used to automatically generate unit tests, including in loosely-typed languages such as JavaScript.

BACKGROUND

In computer programming, unit testing is used to test aspects or units of source code to determine whether they function properly and are ready for release and use. Unit tests are one of the most important ways to perform quality control of the source code. Unit tests can be used to check every outcome of each function. For example, unit tests can be run after changes are made to source code so that running the unit test will tell ensure that none of the additions or modifications affect application integrity.

Creating and maintaining unit test is a very time consuming, often repetitive task. Time is spent not only on writing test scenarios, but on writing code to set up and run the tests. Since this is a manual process, human error is possible, and no two sets of unit tests are likely to be similar in appearance, especially if created or maintained by different people or groups.

Another difficult issue arises in formatting the tests' code and in titling the scenarios. While tools exist to check and enforce formatting rules for the code itself variable and function names (including the titles of scenarios) is left unchecked and for the programmer. As a result, duplicate, inconsistent, or incorrect titles may be used. Since those running the unit tests may use the titles as identifiers to check if a test is passing or not results may have unintended meanings or be incorrect.

Some programmers use "code snippets" or "live templates" to make it easier to type repeating code patterns and can make writing test setup code easier. However, these have three major shortcomings in that they: 1) cannot generate test code automatically, 2) cannot generate test titles automatically, and 3) are editor-bound to a particular IDE (software development environment), each of which has its own format.

SUMMARY OF THE INVENTION

Based on these and other needs in the field, it is therefore desirable to provide a system, apparatus, and method, which solves at least some of the drawbacks associated conventional unit test generation.

In one aspect of the present disclosure, a system for generating unit tests based on source code can be provided having a computer, coupled to a processor. A source code file can be available to the computer and contains source code having a plurality of constructs. The plurality of constructs each having a type, such types including functions, return statements, property assignments, function calls, and branches. An abstract syntax tree can be generated by the computer based on the source code and the plurality of constructs. The abstract syntax tree has a plurality of nodes, wherein each of the plurality of constructs in the source code has a corresponding node. At least one unit test can be generated by the computer based on the nodes of the abstract syntax tree and pre-defined rules. The unit test includes at least one grouping function corresponding to a function construct or a branch construct. The unit test includes at least one trial function corresponding to a return statement construct, a property assignment construct, or a function call construct.

In another aspect of the present disclosure, a computer-implemented method can be provided including: receiving at a computer a source code file having a plurality of constructs, the plurality of constructs each being of a type, such types including functions, return statements, property assignments, function calls, and branches; generating an abstract syntax tree based on the source code and the plurality of constructs, the abstract syntax tree having a plurality of nodes, wherein each of the plurality of constructs in the source code has a corresponding node; and generating a unit test based on the nodes and pre-defined rules, the unit test including at least one grouping function corresponding to a function construct or a branch construct and the unit test including at least one trial function corresponding to a return statement construct, a property assignment construct, or a function call construct.

In another aspect of the present disclosure, a non-transitory tangible computer-readable device having instructions stored thereon that, when executed by a computing device, cause the computing device to perform operations including: receiving at a computer a source code file having a plurality of constructs, the plurality of constructs each being of a type, such types including functions, return statements, property assignments, function calls, and branches; generating an abstract syntax tree based on the source code and the plurality of constructs, the abstract syntax tree having a plurality of nodes, wherein each of the plurality of constructs in the source code has a corresponding node; and generating a unit test based on the nodes and pre-defined rules, the unit test including at least one grouping function corresponding to a function construct or a branch construct and the unit test including at least one trial function corresponding to a return statement construct, a property assignment construct, or a function call construct.

BRIEF DESCRIPTION OF THE DRAWINGS

The objects and advantages of the present disclosure will be apparent upon consideration of the following detailed description, taken in conjunction with the accompanying drawings, in which like reference characters refer to like parts throughout, and in which:

FIG. 8 shows a unit test generated from the source code of FIG. 5 and the abstract syntax tree of FIG. 7.

FIG. 9 shows a formatted version of the unit test of FIG. 8.

FIG. 10 shows a formatted version of the unit test of FIG. 8.

DETAILED DESCRIPTION OF THE INVENTION

Figure 1:
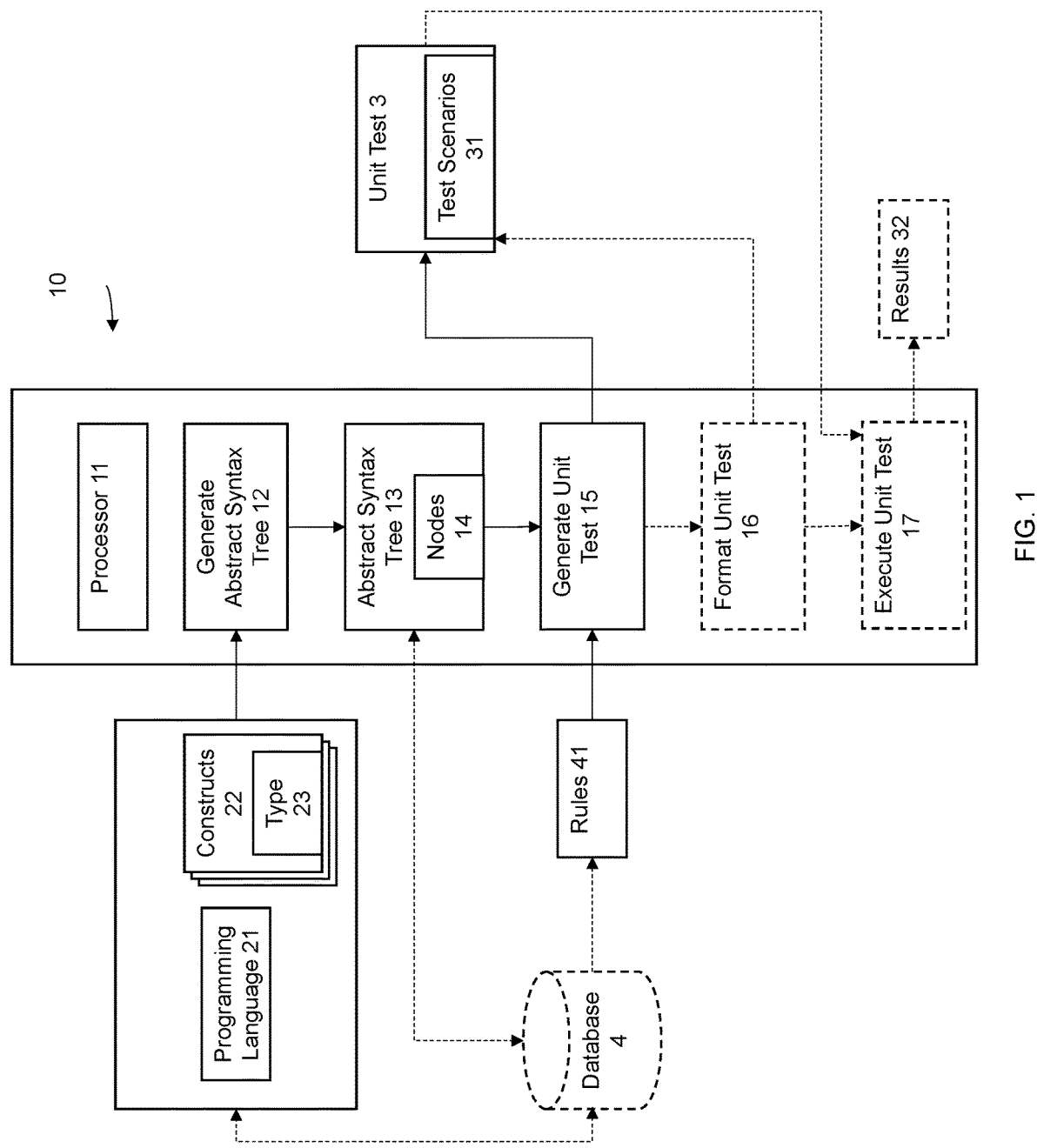
FIG. 1 shows a schematic diagram of a system and method in accordance with the present disclosure.

Although this disclosure is illustrated with reference to a preferred embodiment and a specific example thereof, it will be readily apparent to those of ordinary skill that the art that other embodiments and examples may perform similar functions and/or achieve user experiences. All such equivalent embodiments and examples are within the spirit and scope of the present invention, are contemplated thereby, and are intended to be covered by the following claims.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention, and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring to FIG. 1, the present disclosure describes a system and method 10 for generating unit tests using static source code analysis. Preferably, the system and method generate unit tests automatically by performing a static analysis of source code at initial step.

According to some embodiments, a system and method for generating unit tests can use one or more processes static source code analysis. In a non-limiting example, the system and method can automate the generation of unit tests by performing a comprehensive analysis of the source code at an initial step. The raw code, represented as a string, undergoes a parsing and static analysis process to extract constructs, identify relationships, and infer test scenarios.

The parsing algorithm employed in the system dissects the raw source code, breaking it down into individual tokens and understanding its structure, syntax, and semantics. In a non-limiting example, this process involves lexical analysis, where the code is tokenized to identify keywords, identifiers, operators, and literals. The parsed code forms the basis for subsequent analysis. During the parsing phase, specific algorithms are utilized to extract various constructs from the code. These constructs include but are not limited to variable declarations, function parameters, property assignments, and other language-specific elements. Each construct represents a distinct entity within the codebase.

For instance, in a non-limiting example, the parsing algorithm identifies function declarations by analyzing function signatures and parameters. It recognizes property assignments by examining statements that assign values to variables or object properties. By extracting these constructs, the system gains a comprehensive understanding of the code's composition and structure.

In addition to extracting constructs, the parsing and static analysis algorithms establish relationships between them. These relationships provide insights into the code's interactions and dependencies. In a non-limiting example, the algorithms determine parent-child relationships, sibling relationships, and nesting levels within the code. By understanding these relationships, the system obtains a holistic view of the codebase.

The static analysis process goes beyond simple parsing to infer meaningful test scenarios from the extracted constructs and their relationships. In a non-limiting example, the system employs various algorithms and techniques to generate test cases that cover different code paths and behaviors. These algorithms consider the context and semantics of the code to make intelligent inferences about the expected behavior.

For example, when encountering function calls, the system analyzes the corresponding arguments to generate test cases that exercise various execution scenarios. In a non-limiting example, the system may identify function calls with different argument combinations and generate tests to verify the behavior of the called functions under different input conditions. Moreover, the static analysis process can consider control flow constructs, such as if statements, loops, and branching logic, to generate test scenarios that cover all possible execution paths. In a non-limiting example, the system identifies conditions within if statements and generates tests to evaluate both true and false branches. This ensures comprehensive coverage of the code's conditional behavior.

The parsing and static analysis algorithms can transform the raw source code into an Abstract Syntax Tree (AST). The AST represents the code as a tree-like structure, where each node corresponds to a construct within the code. In a non-limiting example, the AST captures the hierarchical relationships between different constructs, providing a high-level overview of the code's composition.

In the AST, each node represents a construct, such as a function declaration, a variable assignment, or a control flow statement. In a non-limiting example, the AST effectively organizes the code's components and their relationships. This structured representation allows the system to navigate through the code, extract additional information, and apply further analysis techniques.

The generated AST serves as a powerful foundation for subsequent stages of the unit test generation process. It enables the system to traverse the code, identify relevant constructs, and extract additional details. In a non-limiting example, the AST facilitates the identification of constructs that require specific test scenarios or additional setup code, ensuring comprehensive test coverage.

Thereby, parsing and static analysis algorithms can be configured to automatically generate unit tests. A parsing algorithm dissects the raw source code, extracting constructs, while the static analysis phase identifies relationships between these constructs and infers meaningful test scenarios. By employing these algorithms, the system can be configured to analyze the codebase to generate effective unit tests that cover various code paths and behaviors.

In some embodiments, system 10 can includes a computer 1. The computer 1 may be or include a processor 11, remote computer, computer server, network, memory, or any other computing resource, including mobile devices. Computer 1 may be in data communication with a database 4, which can be storage attached to computer 1, networked storage, or Internet storage. The computer may include or have access to all elements depicted within the dashed rectangle of FIG. 1. As a non-limiting example, the server 1c of FIG. 11 may be the computer 1.

Source code 2 may be available to the computer 1. Source code 2 may be in a source code file, available on internal or removable storage of the computer 1, accessible via a network, or stored in a database accessible to the computer 1, such as database 4. The source code 2 may be written in a programming language 21. Preferably, the programming language 21 can be a loosely-typed language (i.e., one that does not require variables to be defined) such as JavaScript or one of its derivatives. The disclosed system and method may be universal and may be implemented in other languages with their own structures specifics for testing source code. Other loosely-typed languages, such as Python and Ruby, have differing specifics on types of abstract syntax tree nodes to be processed, how to create internal intermediate objects to store code information, and how to write the unit test. Strongly-typed languages, such as NET and Java, may be more complex.

The source code 2 may have a plurality of constructs 22. Constructs 22 can be considered as building blocks for source code and provide structure and meaning thereto. Constructs 22 can each be of a type 23 that describes their role in the source code. Types 23 can include, but are not limited to functions 231, branches 232, property assignments 233, function calls 234, and return statements 235. At a high level, a function 231 can be a subroutine generally written to perform a single task. Branches 232 can be forks in code wherein a tine of the fork can be taken only if certain logic permits (i.e., if statements, while statements, for loops, etc.). Property assignments 233 can assign values to variables. Functions calls 234 can include code that seeks to run a function and pass it variable arguments. A return statement 235 can be an end of a function 231, through which returned variables/results can be provided.

Types 23 can also be defined by their effect on the flow of a program or function therein. For example, unit tests should test return statements 235 for what values may be returned. Some types, such as property assignments 233 and function calls 234, may include actions within a function 231 that have affects outside the scope of that function. For example, property assignments 233 may include assignments of variables external to the function 231, and function calls 234 may call other functions inside of or as part of a function 231. Finally, branches 232 may include if/else statements, switch statements, ternary operators, or any possible control flow of the function.

A system and methodology may be configured to utilize static source code analysis by traversing the Abstract Syntax Tree (AST) to create an intermediate representation. This intermediate representation serves as an object that captures essential details about the code being analyzed, such as the properties being tested, the type of functions involved, and the necessary context for testing each function.

During the traversal of the AST, the system targets specific node types in the syntax tree. This traversal process involves a function that receives two arguments: the AST itself and an object that specifies the nodes to be captured and the corresponding functions to be executed. This function acts as a guide through the AST, allowing for the extraction of valuable information from the nodes. For example, when encountering a function declaration node in the AST, the system can extract the function's name and its parameters. This information is crucial for generating relevant test scenarios that cover various input configurations. Additionally, when encountering a return statement node, the system can extract the expected return value of the corresponding function. This enables the generation of test cases that verify the correctness of the function's output.

By traversing the AST and extracting information from specific nodes, the system obtains a comprehensive understanding of the code's structure and behavior. This information forms the basis for generating the unit tests and ensuring their effectiveness in covering different aspects of the codebase. In a non-limiting example, the system employs predefined rules that determine which nodes should be tested based on their correlation with specific construct types. These rules provide instructions or configuration information to the system for each construct type, allowing for the extraction of additional details from the corresponding nodes.

For instance, if a node corresponds to a function declaration, the predefined rules may instruct the system to extract not only the function's name and parameters but also any additional context necessary for testing that function. This context could include dependencies, mocked objects, or setup requirements. Similarly, if a node corresponds to a return statement, the rules may specify the expected return value to be compared against the actual output during testing. The unit test generation process involves creating test scenarios that relate to the constructs in the source code or the nodes in the AST. The unit test comprises two types of test scenarios: grouping functions and trial functions, which are also known as describe and it functions, respectively.

Grouping functions can be utilized to create blocks that group related test cases together. These functions typically take two arguments: a string that describes the block and a function that groups the individual test functions. For example, a node associated with a function declaration may have a grouping function in the unit test that includes the name of the function, such as describe ("foo"). Similarly, a node associated with a branch construct may have a grouping function that includes the condition for that branch, such as describe ("'if param_a is true' . . . ").

Trial functions, on the other hand, are generated for constructs such as property assignments, function calls, and return statements. These functions capture the actual test content and typically take two arguments: a string describing what is being tested and a function that contains the test logic. Each trial function may contain one or more expectations, which define the desired behavior or outcome of the code being tested. In a non-limiting example, the system utilizes the extracted information from the AST to generate relevant test scenarios within these grouping and trial functions. By incorporating the details extracted from the nodes, the system ensures that the unit tests cover various code paths and behaviors, providing comprehensive test coverage.

The system and methodology can employ AST traversal and static analysis to generate unit tests. By traversing the AST and extracting information from specific nodes, the system gains insights into the code's structure and behavior. The extracted details, in conjunction with predefined rules, enable the generation of test scenarios that cover different constructs and behaviors within the codebase. By utilizing grouping and trial functions, the system organizes the test cases and captures the necessary test content. This approach ensures effective unit test generation and comprehensive test coverage.

Pre-defined rules 41 can be available to the computer 1. The rules 41 may be in a file, available on internal or removable storage of the computer 1, accessible via a network, or stored in a database accessible to the computer 1, such as database 4. The rules 41 may be dependent on the programming language 21 of the source code 2. The rules 41 may be selected by the user or selected by the computer 1 during runtime based on the programming language 21 of the source code 2.

Pre-defined rules 41 may be used by the computer 1 to determine whether a node corresponding to a construct 22 is to be tested. For example, the rules 41 may be configured to identify all nodes 14 corresponding to a construct 22 of a certain type 23 and may also provide instructions or configuration information to the computer 1 for each type 23, such as to extract additional information.

For example, if a node 14 corresponds to a function declaration type 231, rules 41 may instruct the computer 1 to extract the function's name and its parameters. As another example, if a node 14 corresponds to a function declaration type 231, rules 41 may instruct the computer 1 to extract the expected return value of that function.

Figure 2:
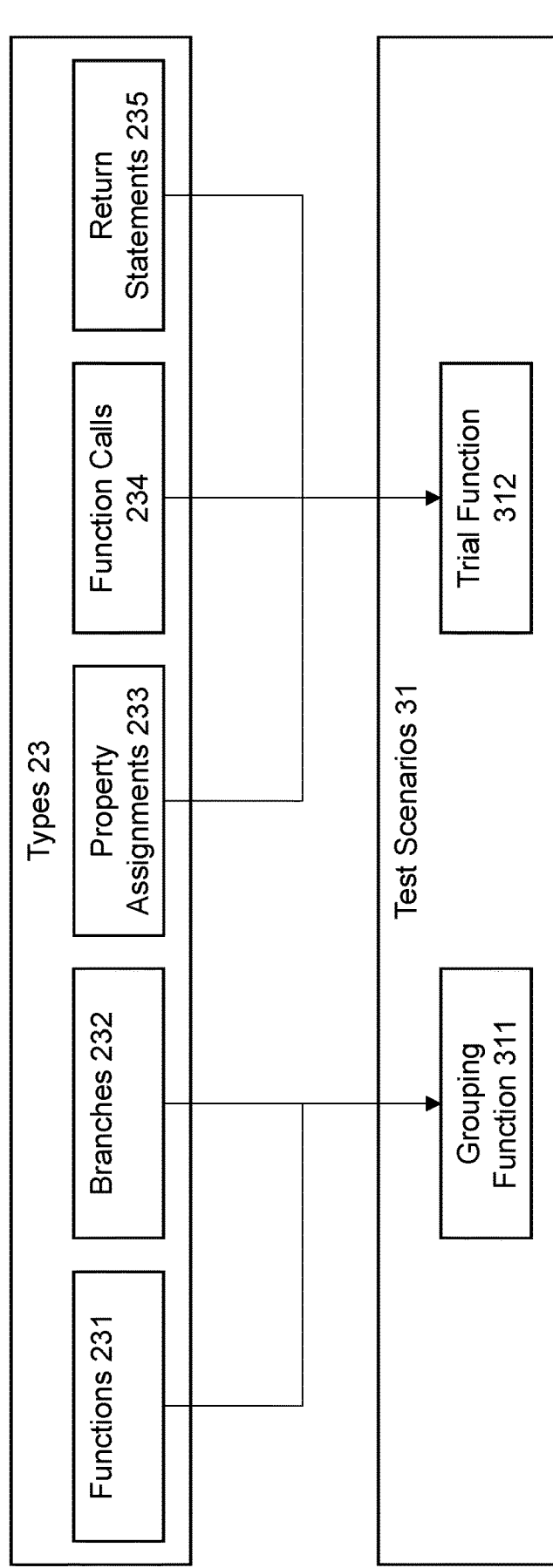
FIG. 2 shows a schematic diagram of a mapping between types and test functions in accordance with the present disclosure.

The computer 1 can take the source code 2 as input to generate unit test 3. Unit test 3 may comprise multiple test scenarios 31. Test scenarios can each relate to constructs 22 in the source code 3 or nodes 14 in the abstract syntax tree 3. The unit test 3 can have two types of test scenarios 31:

grouping functions 311 and trial functions 312. Grouping functions 311 and trial functions 312 may also be known as describe and it functions. Pre-defined rules may determine if a grouping function 311 or trial function 312 can be generated for a node 14 based on the node's correlation with a construct 22 type 23. For example, as shown in FIG. 2, functions 231 and branches 232 may be used to generate grouping functions 311. Property assignments 233, function calls 234, and return statements 235 may be used to generate trial functions 312.

Grouping functions 311 can be used to create blocks that group tests. Grouping functions 311 may have two arguments: a string describing the block and a function that groups the test functions. Any node 14 associated with a function 231 may have a grouping function 311 in the unit test 3 that includes the name of the function 231 (e.g., describe ("foo")). Any node 14 associated with a branch 232 may have a grouping function 311 that includes its condition (e.g., describe ("'if param_a is true' . . . ").

Trial functions 312 can be generated for any property assignments 233, function calls 234, and return statements 235. Trial functions 312 may have two arguments: a string describing what is being tested and a function that contains the test content. Each trial function may contain one expectation, for example, that a function return a literal value. An example title would be it ('returns "bar", . . . ).

Results 32 can be generated if a unit test 3 is executed. Results 32 may show that the source code passes the unit test 3, or fails the unit test 3. Results 32 may also provide suggestions to pass the unit test 3 if the source code 2 failed the unit test 3.

Figure 3:
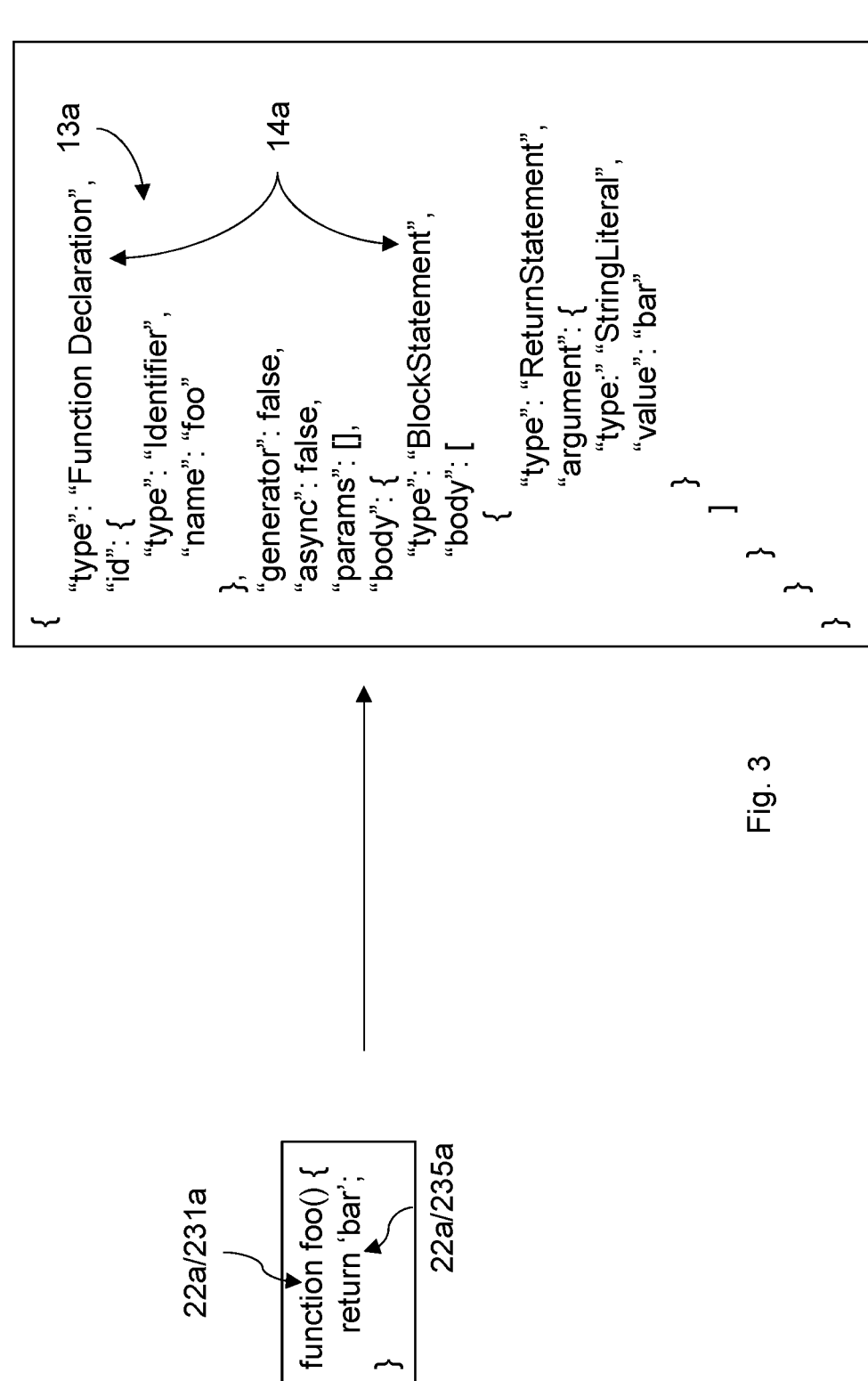
FIG. 3 shows a function called "foo( )" that returns the string "bar" and an abstract syntax tree representation of that function.

The operation of the system 10 of FIG. 1 is now explained. To generate a unit test 3, the source code 2 can be parsed, preferably as a string, by the computer 1 to generate 12 a parse tree as an example an abstract syntax tree 13. The abstract syntax tree 13 can be a tree representation of the source code 2, wherein each node 14 of the tree 13 is a construct 22 occurring in the source code 2. FIG. 3 shows an abstract syntax tree representation 14a of a function 231a called "foo" that returns a string 235a "bar."

The abstract syntax tree 13 may be traversed to identify the nodes 14 corresponding to constructs 22 to be tested and to extract relevant information. Pre-defined rules 41 may be used by the computer 1 to determine whether a node 14 corresponding to a construct 22 is to be tested. The abstract syntax tree 13 may be traversed by targeting particular node 14 types 23 in the abstract syntax tree 13. As a non-limiting example, a function receives two arguments: the abstract syntax tree 13 and rules 41 identifying at which nodes 14 and what function to execute. This function may then traverse the abstract syntax tree 13 and, when finding a node 14 of one of the types 23 declared in its second argument, may execute the function to extract information from nodes 14 from the abstract syntax tree 13 of the source code 2. The abstract syntax tree 13, representing the structure of the source code 2, can be effectively traversed by targeting specific node 14 types 23 within the tree. This traversal process allows for the extraction of valuable information from the nodes, which is essential for generating unit tests and capturing the desired behaviors of the code.

In one approach, a function can be employed to traverse the AST by receiving the AST itself and rules 41 as arguments. These rules identify the specific nodes 14 and corresponding functions to be executed during the traversal. The function can then navigate through the AST, examining each node encountered, and executing the designated function whenever a node of the declared type is found. This allows for the extraction of relevant information from the nodes within the abstract syntax tree.

Alternative methods for traversing the AST can also be employed to achieve suitable results. In an alternative example, a traversal algorithm can utilize of pre- and post-visitor functions. Pre-visitor functions are executed before traversing the child nodes of a particular node, while post-visitor functions are executed after traversing the child nodes. These visitor functions can be defined to perform specific actions on the nodes based on their types, allowing for the extraction of information or the execution of desired operations during the traversal process. By implementing pre- and post-visitor functions, the system can capture information from the nodes in a controlled manner, offering flexibility and customization in the traversal process.

In another example, traversing the AST involves the utilization of a recursive algorithm. This recursive approach starts from the root node of the AST and recursively explores each child node, applying the necessary logic or operations at each step. By recursively traversing the tree structure, the system can systematically examine and process each node in a depth-first or breadth-first manner, depending on the requirements of the analysis or test generation process. The recursive algorithm can be designed to handle different node types and their corresponding operations, allowing for comprehensive AST traversal and information extraction.

Furthermore, a stack-based traversal method can also be considered as an alternative. This approach involves maintaining a stack data structure to keep track of the nodes to be visited during the traversal. The system can push the initial node or nodes onto the stack and then repeatedly pop a node from the stack, examine its properties and perform the necessary actions, and push the child nodes onto the stack for future exploration. This iterative traversal method offers an alternative to recursive approaches and can be advantageous in scenarios where a recursive implementation may not be feasible or efficient.

Alternative methods for traversing the AST can be used individually or in combination, depending on the specific requirements and constraints of the system. The choice of traversal approach may depend on factors such as performance considerations, the complexity of the codebase, and the desired level of control and customization during the traversal process.

While the function-based approach described earlier is a viable method for traversing the AST and extracting information, alternative techniques such as pre- and post-visitor functions, recursive algorithms, and stack-based traversal can also be utilized. These alternative methods offer flexibility, customization, and efficiency in navigating the abstract syntax tree and capturing the necessary details for generating comprehensive unit tests. The selection of the most suitable traversal approach may depend on various factors and considerations specific to the system's requirements.

As a further example, and referring to FIG. 3, the abstract syntax tree 13a can be traversed and the nodes 14a of type FunctionDeclaration and ReturnStatement can be identified, which correspond to constructs 22a having function declarations 231a and return statements 235a types. The FunctionDeclaration node 14a informs the computer 1 that the function name is "foo", and that it has no parameters. The ReturnStatement node 14a shows that there is only one return statement, and that it returns a static string literal. To generate the unit test 3, the computer 1 can iterate over the extracted nodes 14 and the related information to create setup code and test scenarios 31 for each node 14, preferably in string format. This setup code can be configured to create the required context and environment to execute the test scenarios effectively.

The setup code is tailored to the preferred test framework format, as each framework often has its own conventions and functions for setting up the test environment. It involves preparing the necessary context and defining the required variables or arguments for the tested function to ensure accurate execution of the test scenarios. The format and content of the setup code can vary depending on the type of code being tested and the specific test framework used.

In a non-limiting example, a function can be provided that takes a single argument b and returns the sum of this a and b. To properly test this function, we need to define the variable a in the test scenarios' context. The setup code will be responsible for creating this context and providing the necessary values.

For instance, when using Jest as the test framework in JavaScript, the setup code can be created using a beforeEach block. This block executes before each test scenario, ensuring a fresh and consistent context for the function under test. In an example of the sum function, the setup code be provided as follows:

```
beforeEach( ( ) => {
    context = { a: 2 };
});
```

In this example, the context object is defined, and the variable a is set to the value 2. This setup code ensures that a is available in the test scenarios and can be accessed within the tested function.

The created setup code will be used in the subsequent test scenarios. For instance, in a test scenario that aims to verify the result of calling the sum function with b=3, we can utilize the previously defined context as follows:

sum.call(context, 3);

In this test scenario, the sum function is invoked with the context as the execution context (this), and 3 as the argument for b. The expected result of this execution is 5, as a is set to 2 and b is 3, resulting in 2+3=5.

Additionally, the setup stage can also involve defining function arguments beforehand. For instance, if we want to test the sum function with a specific value for b across multiple test scenarios, we can define it in the setup code. This ensures consistency and avoids redundant code in each individual test scenario. Thereby, the generation of setup code can establish necessary context and environment for executing the test scenarios accurately. The setup code can be configured suitably to the test framework's format and to include processes for defining variables, providing arguments, and creating the required context. By appropriately setting up the test environment, the unit tests can effectively validate the behavior and correctness of the code under test.

For example, there can be a direct correlation between nodes 14 in the abstract syntax tree 13 and a resulting test scenario 31. Test scenarios 31 may include checking that the return statement if a return statement returns an expected value, or that a property assignment 233 and/or function call 234 execute correctly. By analyzing the value of the node's 14 value, the computer 1 can determine how to write a test scenario 31. If the node 14 has a literal value, that value is enough. However, any other types of values may be investigated by checking children node types.

As an example, referring to FIG. 3, it can be expected that the return statement returns the literal value 'bar', and the computer 1 can generate a test scenario 31 for this case.

In one example, the computer 1 can create an empty test string and group test scenarios 31 based on the function 231 or branch 232 they can be a part of. Then, for each test scenario 31, the computer 1 may create required code, including grouping functions, trial functions, and beforeEach statements. The computer 1 may append the code to the empty test string. If any setup needs to be performed, such as to create a mocked context for side effects, it may be established inside the relevant grouping function 311 or trial function 312.

To name or title the test scenario 31, the computer 1 may use the function name, which can be retrieved from the function's declaration 231 node 14, and enough information about what is being returned to generate a text string that explains the case. For the non-limiting example in FIG. 3, the title could be "function foo returns the string 'bar'". The same process works for more complex scenarios. As another example, if a function performs another function call, with certain arguments, those nodes can also be checked and enough information can be extracted to generate both a title and a scenario to test.

The unit test 3 may be created in string format and may use the syntax for frameworks that are designed to work with the programming language 21. For JavaScript, this may include Jest or Jasmine, as non-limiting examples.

After the unit test 3 is written, the computer 1 may format the unit test 16, such as by running a linting and formatting script. Linting scrips may analyze the generated unit test 16 and flag or correct errors, bugs, stylistic errors, and/or suspicious constructs. Formatting scripts may improve the readability for a reader of the unit test 16, such as by including line breaks and/or whitespace. This may turn the unit test 3 into a human-readable text, such as by making variable names easier to read or applying formatting or spacing to break up the unit test 3. In a non-limiting example, formatting 16 may be accomplished with software such as Prettier or ESLint.

The unit test 3 may be output, such as to the computer's 1 standard console output for display on a monitor or to a file, which may be saved in a location accessible to the computer, such as database 4. The user may select where to save the outputted unit test 3. Alternatively, the outputted unit test 3 may be used as input to another process or program, such as one to execute the unit test 3.

The unit test 3 can be executed 17 by the computer 1 and results 32 can be generated, displayed, and/or saved to a file by the computer 1. The results 32 may show if the source code 2 passed the unit test 3, if the source code 2 passed the test scenarios 31, and, if any portion failed, recommendations to improve the source code 2 to pass the unit tests 3.

FIGS. 4-10 show an exemplary and non-limiting example of the system and method disclosed herein.

Figure 4:
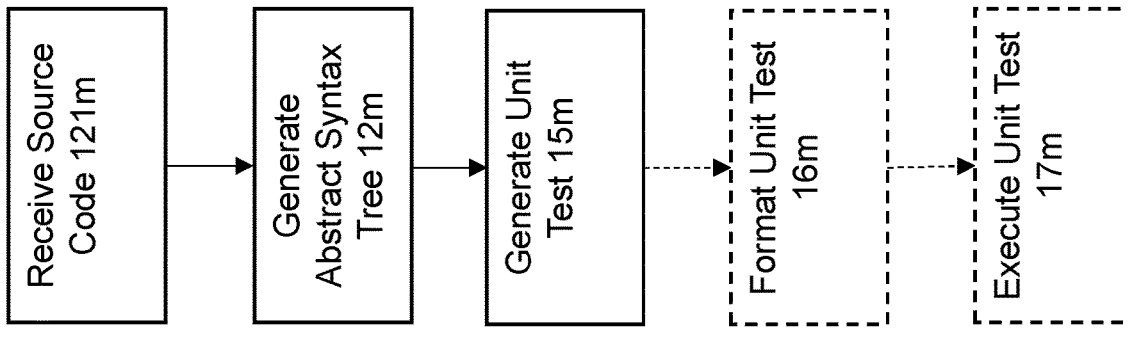
FIG. 4 shows a method in accordance with the present disclosure.
Figure 5:
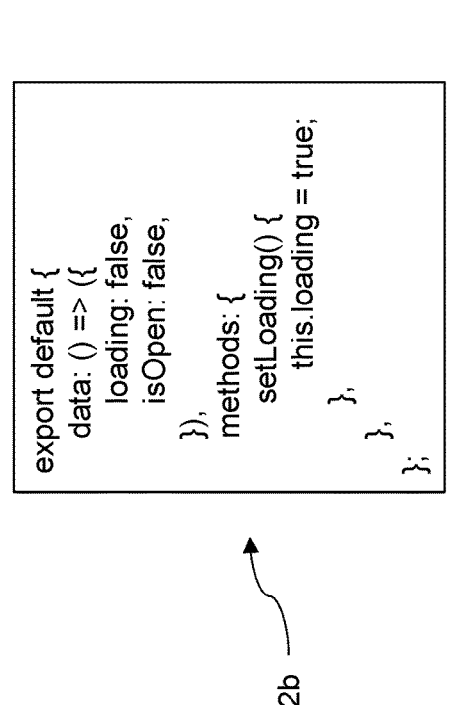
FIG. 5 shows exemplary source code that may be used in the method of FIG. 4.

FIG. 4 shows a method in accordance with the present disclosure. The method of FIG. 4 may be used with the system 10 shown in FIG. 1, or with the system shown in FIG. 11. The method receives source code 121*m*. As described above, the computer may input source code 2, which may have a programming language 21, and constructs 22 of types 23. A non-limiting example of source code 2*b* is shown in FIG. 5.

An abstract syntax tree 13*b* may be generated 12*m* based on the input source code 121*m*. The abstract syntax tree 13 may be traversed by targeting particular node 14 types 23 in the abstract syntax tree 13, as discussed above.

Figure 6:
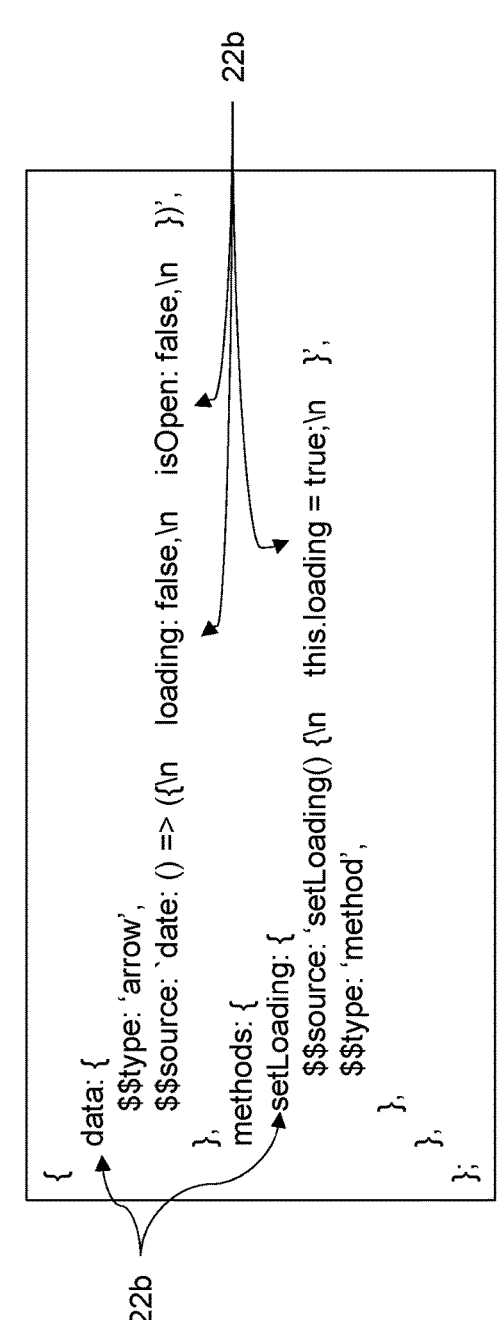
FIG. 6 shows a representation of the constructs in the source code of FIG. 5.

As a non-limiting example, and shown in FIG. 6, in generating the abstract syntax tree 12*m*, an intermediate step may be taken in which constructs 22*b* may be extracted from the source code 2*b*. Features and information regarding the constructs 22*b* may then be extracted from the source code 2*b* to generate the abstract syntax tree 13*b* shown in FIG. 7.

A unit test 3*b* may be generated from the abstract syntax tree 13*b*, as shown in FIG. 8. In some embodiments, the process of generating the unit test 3*b* involves iterating over the extracted nodes 14*b* and their related information to create the necessary setup code and test scenarios 31 for each node 14*b*. This allows for comprehensive testing coverage of the code under analysis. In the generation of the unit test 3*b*, grouping functions 311 and trial functions 312 are generated based on the nodes 14*b* present in the abstract syntax tree 13*b*.

Pre-defined rules, such as the previously discussed predefined rules 41, play a crucial role in guiding the generation of unit tests based on the correlation of nodes 14*b* with specific constructs 22 and types 23. These rules provide instructions and guidelines for generating the appropriate test scenarios for each node, ensuring effective and meaningful testing.

Figure 7:
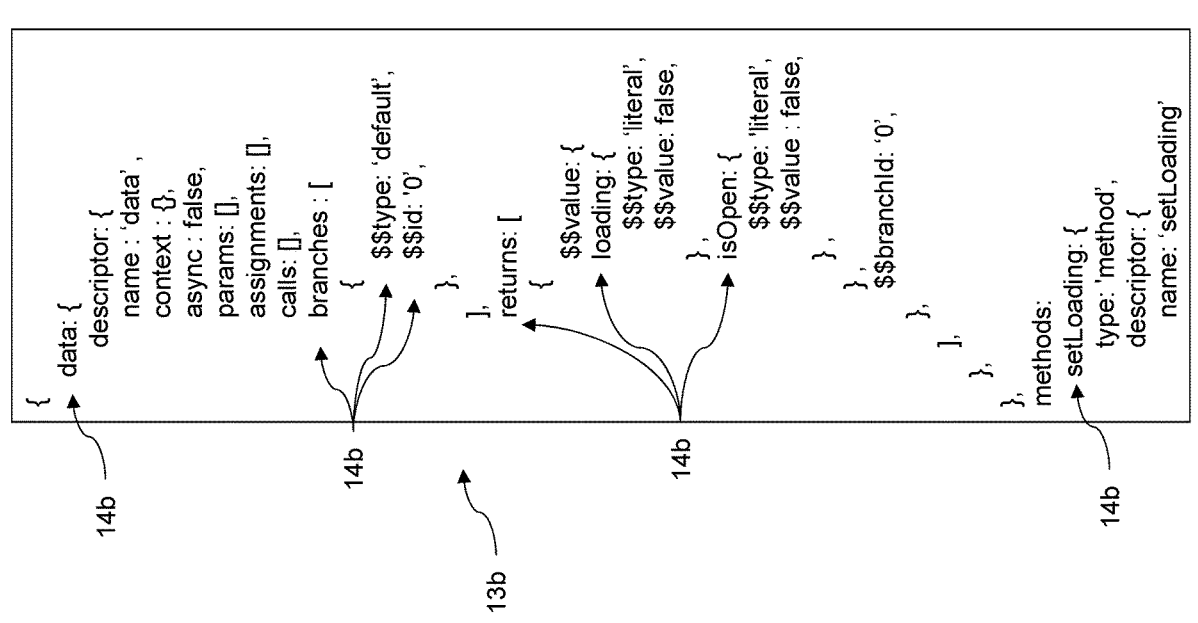
FIG. 7 shows an abstract syntax tree generated from the source code of FIG. 5.

As shown in non-limiting examples in FIGS. 7 and 10, the nodes 14*b* correspond to grouping functions 311*b* and trial functions 312*b*. For example, "default" is defined in FIG. 5 as having "data" and "methods." "Default," "data," "methods," and "setLoading" are transformed into grouping functions 311*b* in the unit test 3. Trial functions 312 are generated to test whether "loading" and "isOpen" are false, and whether setLoading sets the value of loading to true.

In a non-limiting example a property assignment can be considered within the setLoading function, as depicted in FIG. 5. In this case, a specific test scenario is required to validate whether the loading property is correctly assigned the value true. The corresponding unit test 3*b* would include a test scenario designed to determine if this assignment occurs as expected. To achieve this, the initial value of loading can be set to a value other than true during the setup stage. This ensures that the subsequent test scenario focuses solely on verifying the desired assignment behavior.

In embodiments described herein, systems and methodologies are configured to provide flexibility and adaptability of the system and method in generating unit tests for different scenarios and constructs. By incorporating predefined rules and leveraging the information extracted from the abstract syntax tree 13*b*, the unit test generation process can be tailored to various code structures and types. This allows for comprehensive coverage of different types of constructs, including function declarations, property assignments, return statements, and more.

The format and structure of unit tests can vary depending on the chosen test framework or conventions. The system and method are designed to accommodate different testing frameworks and their specific requirements. For instance, in JavaScript, test frameworks such as Jest, Jasmine, or Mocha, for example, may have their own preferred formats for organizing test scenarios and assertions.

In the context of the generated unit test 3*b*, grouping functions 311 and trial functions 312 can be organized in a manner consistent with the chosen test framework's format. These functions serve to group related test scenarios and provide a clear structure for organizing and executing the tests. The specific format and naming conventions used in the unit test 3*b* are dictated by the chosen test framework and the preferences of the developers.

As described herein, a process for generating unit tests can utilize static source code analysis and pre-defined rules. The unit tests are tailored to the structure and constructs present in the code under analysis, allowing for comprehensive testing coverage. With flexibility in accommodating different test frameworks and their conventions, the generated unit tests adhere to the preferred formats and provide clear structures for organizing and executing the tests. The examples provided demonstrate the system's ability to generate test scenarios for different constructs, ensuring thorough validation of the code's behavior.

Optional steps of formatting 16*m* the unit test 3*b* and executing 17*m* the unit test 3*b* are also shown. Examples of formatted unit tests 3*b* are shown in FIGS. 9 and 10, in these examples via Prettier and ESLint.

Figure 11:
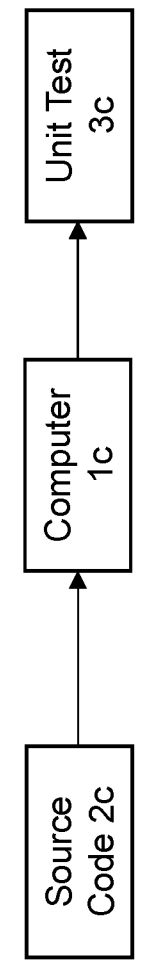
FIG. 11 shows an apparatus according to the present disclosure, in accordance with the systems and methods of FIG. 1 and FIG. 4.

As shown in FIG. 11, a system in accordance with the present disclosure may include source code 2*c*, a server 1*c*, and a unit test 3*c*. The source code 2*c* may be processed by the server 1*c* via the methods shown in FIG. 1 or 4 to generate the unit test 3*c*.

What is claimed is:

1. A system for generating unit tests based on source code, comprising:

a computer, coupled to a processor;

a source code file available to the computer, the source code file containing source code having a plurality of constructs;

the plurality of constructs each being of a type, such types including functions, return statements, property assignments, function calls, and branches;

an abstract syntax tree generated by the computer based on the source code and the plurality of constructs;

the abstract syntax tree having a plurality of nodes, wherein each of the plurality of constructs in the source code has a corresponding node;

at least one unit test generated by the computer based on the nodes of the abstract syntax tree and pre-defined rules;

the unit test including at least one grouping function corresponding to a function construct or a branch construct; and the unit test including at least one trial function corresponding to a return statement construct, a property assignment construct, or a function call construct, wherein the computer is configured to traverse the abstract syntax tree using a recursive algorithm or stack-based traversal to identify one or more nodes of the plurality of nodes corresponding to one or more constructs of the plurality of constructs and to extract code information for generating test scenarios.

2. The system of claim 1, further comprising computer executable code for formatting the unit test.

3. The system of claim 2, wherein formatting the unit test includes making the unit test human readable.

4. The system of claim 1, further comprising computer executable code for executing the unit test and generating results.

5. The system of claim 1, wherein the source code is written in JavaScript or a JavaScript-derivative language.

6. The system of claim 1, wherein the source code is written in a loosely-typed language.

7. The system of claim 1, wherein the pre-defined rules are selected based on a programming language of the source code and provide instructions for how to generate a unit test for a particular node or construct.

8. A computer-implemented method, comprising:

receiving at a computer a source code file having a plurality of constructs, the plurality of constructs each being of a type, such types including functions, return statements, property assignments, function calls, and branches;

generating an abstract syntax tree based on the source code and the plurality of constructs, the abstract syntax tree having a plurality of nodes, wherein each of the plurality of constructs in the source code has a corresponding node;

generating a unit test based on the nodes and pre-defined rules, the unit test including at least one grouping function corresponding to a function construct or a branch construct and the unit test including at least one trial function corresponding to a return statement construct, a property assignment construct, or a function call construct; and wherein the computer is configured to traverse the abstract syntax tree using a recursive algorithm or stack-based traversal to identify one or more nodes of the plurality of nodes corresponding to one or more constructs of the plurality of constructs and to extract code information for generating test scenarios.

9. The method of claim 8, further comprising formatting the unit test.

10. The method of claim 9, wherein formatting the unit test includes making the unit test human readable.

11. The method of claim 8, further comprising executing the unit test and generating results.

12. The method of claim 8, wherein the source code is written in JavaScript or a JavaScript-derivative language.

13. The method of claim 8, wherein the source code is written in a loosely-typed language.

14. The method of claim 8, wherein the pre-defined rules are selected based on a programming language of the source code and provide instructions for how to generate a unit test for a particular node or construct.

15. A non-transitory tangible computer-readable device having instructions stored thereon that, when executed by a computing device, cause the computing device to perform operations comprising:

receiving at a computer a source code file having a plurality of constructs, the plurality of constructs each being of a type, such types including functions, return statements, property assignments, function calls, and branches;

generating an abstract syntax tree based on the source code and the plurality of constructs, the abstract syntax tree having a plurality of nodes, wherein each of the plurality of constructs in the source code has a corresponding node;

generating a unit test based on the nodes and pre-defined rules, the unit test including at least one grouping function corresponding to a function construct or a branch construct and the unit test including at least one trial function corresponding to a return statement construct, a property assignment construct, or a function call construct; and wherein the computer device is configured to traverse the abstract syntax tree using a recursive algorithm or stack-based traversal to identify one or more nodes of the plurality of nodes corresponding to one or more constructs of the plurality of constructs and to extract code information for generating test scenarios.

16. The computer-readable device of claim 15, further comprising formatting the unit test, including making the unit test human readable.

17. The computer-readable device of claim 15, further comprising executing the unit test and generating results.

18. The computer-readable device of claim 15, wherein the source code is written in JavaScript or a JavaScript-derivative language.

19. The computer-readable device of claim 15, wherein the source code is written in a loosely-typed language.

20. The computer-readable device of claim 15, wherein the pre-defined rules are selected based on a programming language of the source code and provide instructions for how to generate a unit test for a particular node or construct.

\* \* \* \* \*